(12) United States Patent
Simoens et al.

(10) Patent No.: US 7,497,325 B2
(45) Date of Patent: Mar. 3, 2009

(54) TILTING WALL

(75) Inventors: Herve Simoens, Marcq en Baroeul (FR); Olivier Lacroix, Limpiville (FR)

(73) Assignee: Societe Financiere de Gestion, Roubaix (FR)

( * ) Notice: Subject to any disclaimer, the term of this patent is extended or adjusted under 35 U.S.C. 154(b) by 0 days.

(21) Appl. No.: 11/041,866

(22) Filed: Jan. 25, 2005

(65) Prior Publication Data
US 2005/0178643 A1 Aug. 18, 2005

(30) Foreign Application Priority Data
Feb. 10, 2004 (EP) ................................. 04350002

(51) Int. Cl.
| B65G 15/00 | (2006.01) |
| B65G 17/00 | (2006.01) |
| B65G 21/20 | (2006.01) |
| B65G 39/18 | (2006.01) |
| B65G 15/60 | (2006.01) |
| B65G 15/08 | (2006.01) |
| B65G 39/10 | (2006.01) |

(52) U.S. Cl. .................... 198/836.1; 198/825; 198/823; 198/837

(58) Field of Classification Search ................. 198/828, 198/860.3, 836.2, 837, 836.1, 735.5, 823, 198/824, 826
See application file for complete search history.

(56) References Cited

U.S. PATENT DOCUMENTS

| 5,048,669 | A | * | 9/1991 | Swinderman | ................ 198/525 |
| 5,267,642 | A | * | 12/1993 | Gharpurey et al. | ........ 198/836.1 |
| 5,350,053 | A | * | 9/1994 | Archer | ........................ 198/525 |
| 5,400,897 | A | * | 3/1995 | Doyle | .......................... 198/496 |
| 5,913,404 | A | * | 6/1999 | Bowman | .................. 198/836.1 |
| 6,293,389 | B1 | * | 9/2001 | Knapp et al. | ................. 198/823 |
| 6,575,294 | B1 | * | 6/2003 | Swinderman et al. | ..... 198/836.1 |
| 2004/0079621 | A1 | * | 4/2004 | Mott | ........................... 198/823 |

* cited by examiner

*Primary Examiner*—Gene O. Crawford
*Assistant Examiner*—Ramya G Prakasam
(74) *Attorney, Agent, or Firm*—Miles & Stockbridge P.C.; Eric G. King

(57) ABSTRACT

The subject of the invention is a guidance surface (4) designed to carry an endless conveyor surface, this surface being characterized in that the curvature of the guidance surface is determined by a horizontal roller (7) and two fixed lateral surfaces (8) located on either side of the aforementioned roller, where each lateral surface is extended beyond the bearing surface occupied by the belt, and, at least locally, at least one of the lateral surfaces is fixed to the chassis by means of rapid fixing devices so as to constitute an access door.

20 Claims, 4 Drawing Sheets

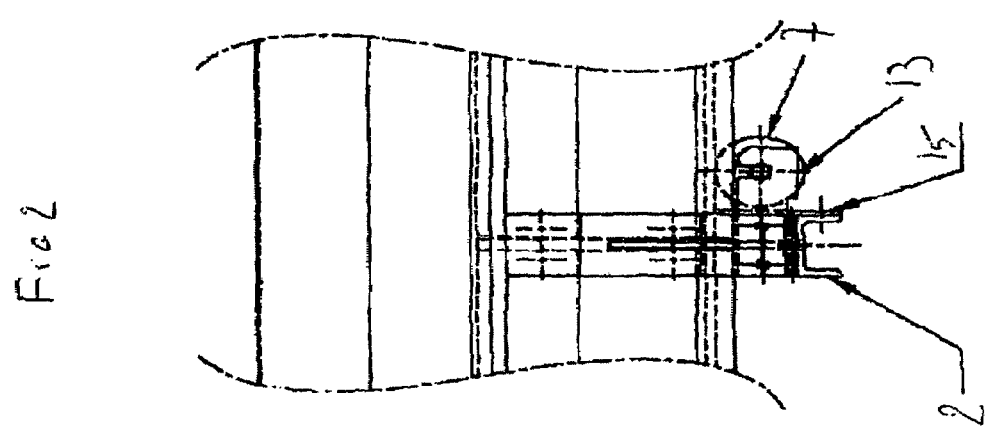
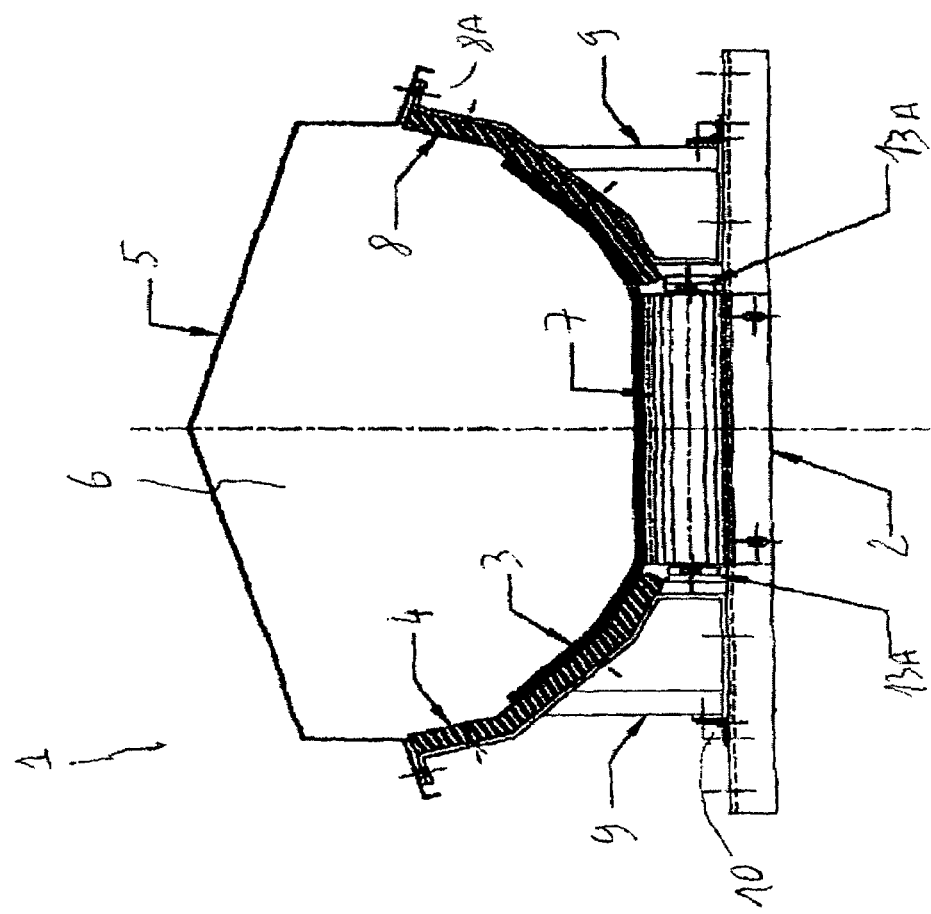

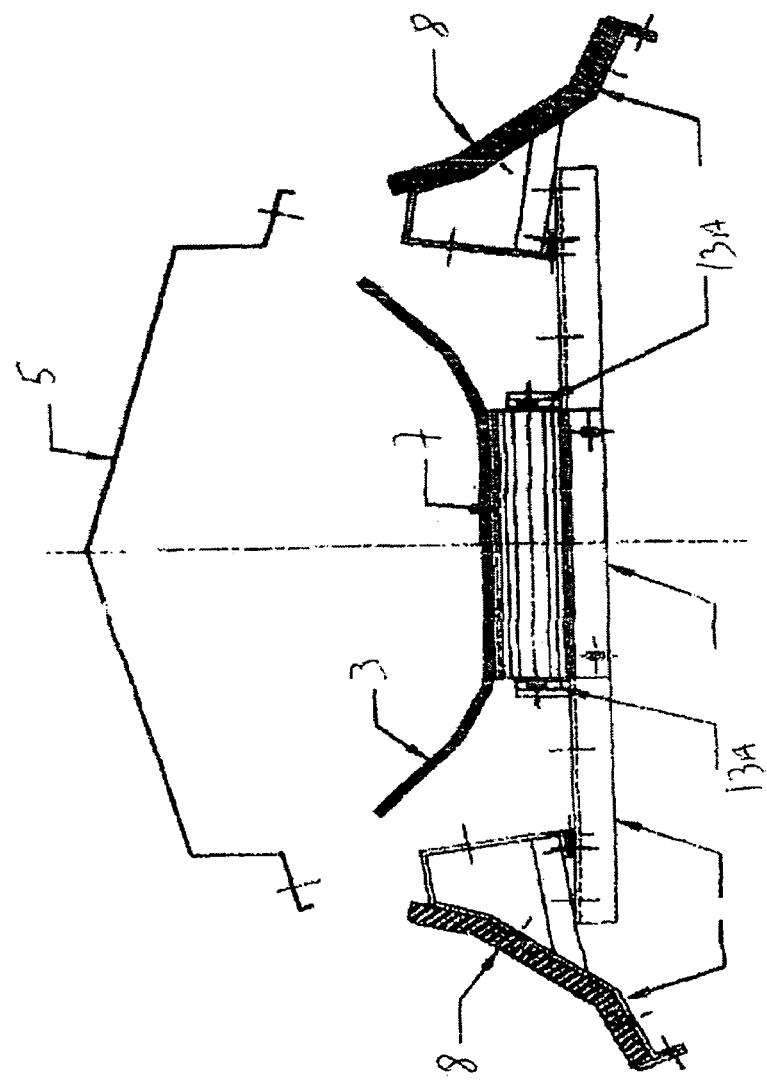
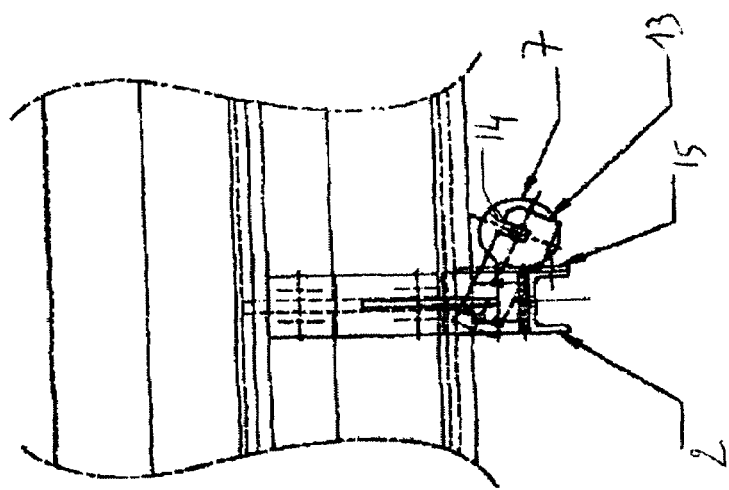

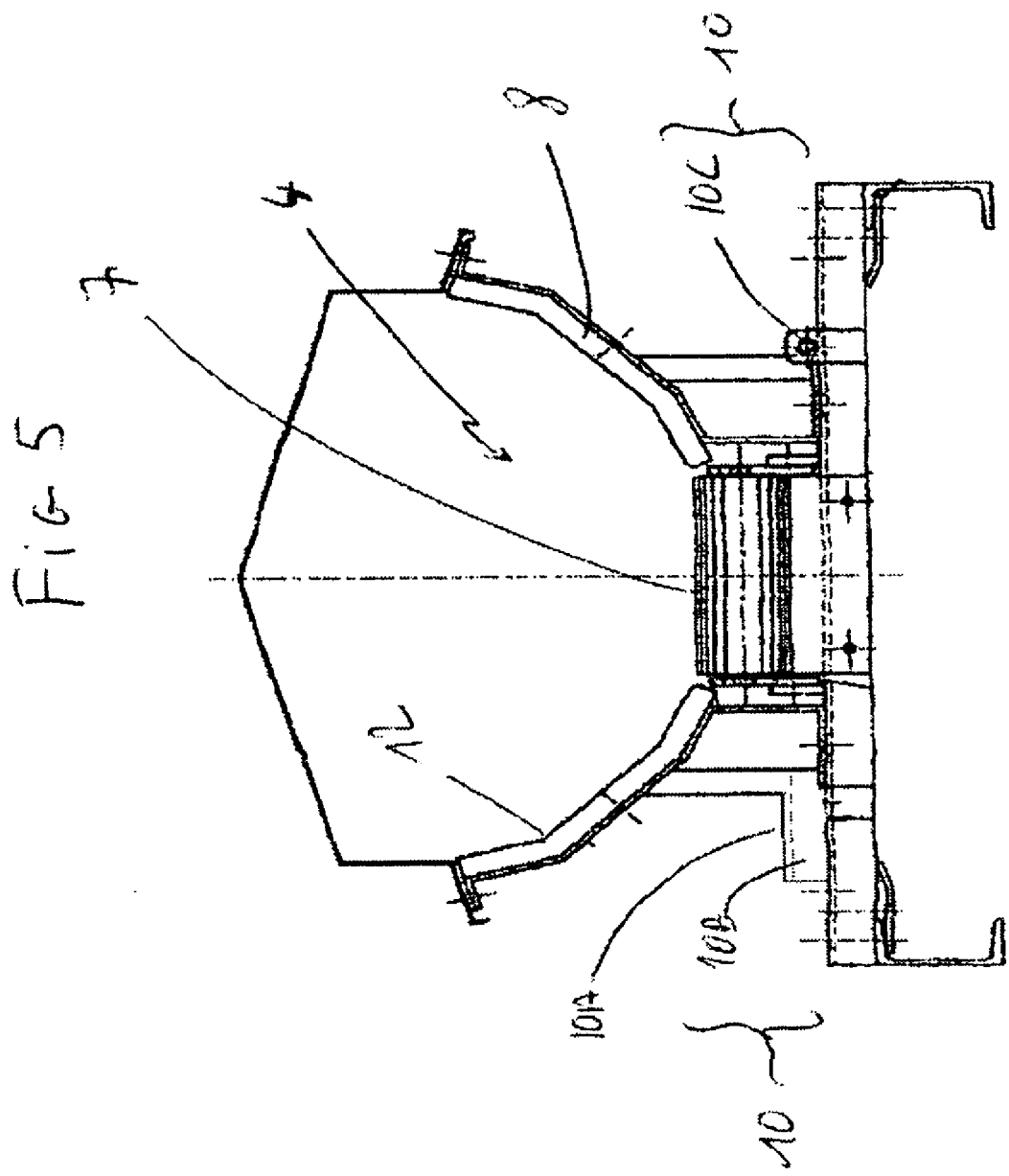

TILTING WALL

RELATED APPLICATION

This application is related to a co-pending application Ser. No. 11/041,867 filed concurrently herewith in the name of Herve SIMOENS and Olivier LACROIX and entitled "Tilting Roller". The subject matter of said application is hereby incorporated by reference in its entirety.

BACKGROUND OF THE INVENTION

1. Field of the Invention

The invention relates to a guidance surface designed to carry an endless conveyor surface. It also relates to the belted or batten-type conveyors fitted with the said guidance surface.

2. Description of Related Art

The transfer of products in bulk from one place to another can be effected with different appliances, the choice of which depends on different parameters such as the distance transported, the volume to be transported per unit of time, and so on.

For the products in bulk, one is chiefly familiar with the endless-worm or belt-type conveyors. The endless worms are generally used over short distances while the belt-type conveyors are used over greater distances.

When these endless-belt conveyors are carrying bulk products, the active part of the belt must be shaped in a V or in U in order to constitute a sort of gully or trough containing the material throughout its journey. At the present time, in order to obtain this V or U shape, the belt runs sets of supporting rollers placed all along the trajectory. The geometrical position of the rollers on such an assembly determines the degree of concavity of the belt and therefore the desired profile.

In general, for this guidance assembly, use is made of a central horizontal roller and two or more lateral rollers which are sloped in relation to the horizontal so as to raise the edges of the endless belt.

When these conveyors are carrying granular materials, such as those present in ports or on sites for the extraction and transformation of granular materials, a part of the materials transported by the conveyor is transformed into airborne dust, and pollutes the environment.

The speed of movement of the belt increases the effects of the wind, and the quantity of material thus released is quite significant, particularly at the unloading docks of bulk carriers. These dusts have to be reduced.

One solution (FR-A-2.283.070) has been demonstrated by placing the active part of the belt in an enveloping cylindrical tube. This tube can be in a single piece or formed from assembled sections of tube. The belt slides in the tube, and it is the internal face of the tube which acts as the guide and geometrical shaper of the belt.

During the movement of the belt in the tube, two phenomena occur. The first phenomenon is the formation of a cushion of air between the carrying surface of the tube and the lower face of the belt. The belt is then effectively suspended. This avoids the use of a large number of rollers.

The second phenomenon is the formation of a current of air which carries most of the dust to the exit. With such a system, airborne dusts can thus be limited. In fact, the dust can escape from the tube only at the ends, where the means to monitor dust dispersion can be placed.

Unfortunately, this technology has a major drawback in the sense that dust is able to infiltrate between the belt and the carrying surface, and as it accumulates, it degrades the operation of the conveyor. This in turn leads shut-downs and cleaning operations. These shut-downs are very lengthy, since one has to remember that the belt is located inside a tube formed of tubular sections end to end, and that it can be relatively long. This renders it difficult to locate the trouble and deal with it. This also applies to maintenance work, which has to be performed regularly.

SUMMARY OF THE INVENTION

The invention proposes to provide a solution to the problems mentioned above in particular. To this end, the subject of the invention is a guidance surface designed to support an endless carrying surface of a conveyor, where this surface is characterised in that the curvature of the guidance surface is determined by a horizontal roller and two lateral surfaces located on either side of the aforementioned roller. Each lateral surface extends beyond the bearing surface occupied by the belt and, at least locally, at least one of the lateral surfaces is fixed to the chassis by rapid securing devices so as to constitute an access door.

It also relates to the equipped conveyor.

BRIEF DESCRIPTION OF THE DRAWINGS

The invention will be properly understood through the following description, provided as a non-exhaustive example with regard to the drawing which represents it diagrammatically:

FIG. (1): view in transverse section of a conveyor according to the invention.

Figure 6:
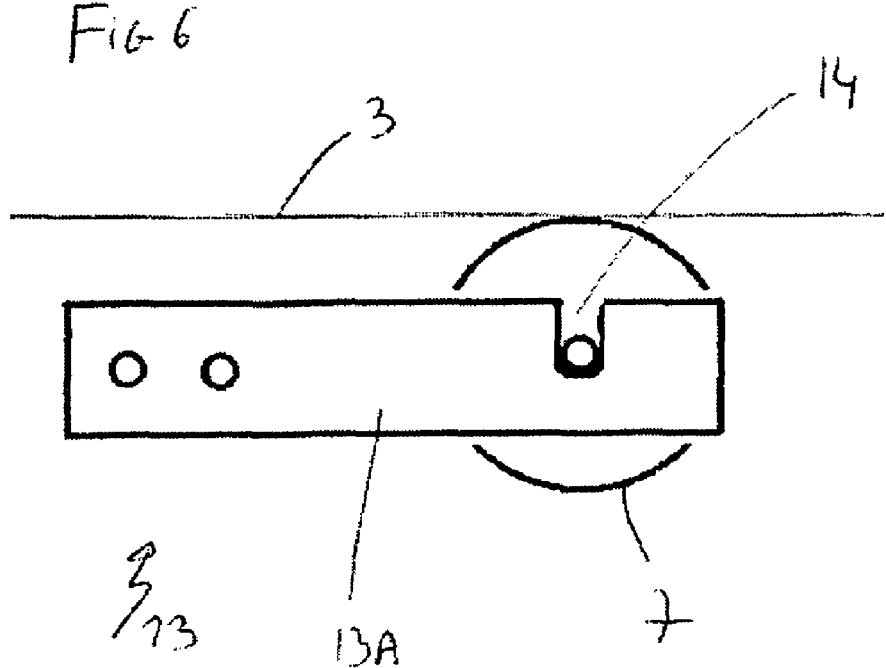
Figure 7:
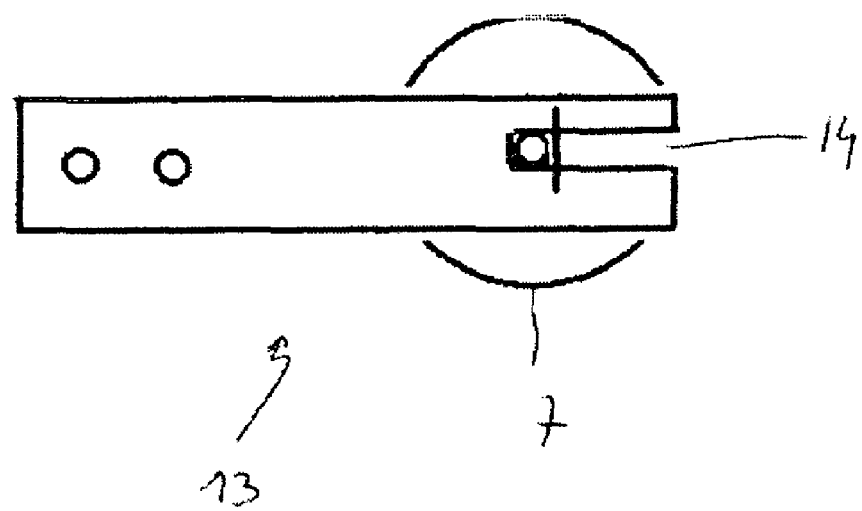

FIG. (2): sideways view of FIG. 1.

FIG. (3): view of the conveyor of FIG. (1) during maintenance work.

FIG. (4): the conveyor of FIG. (2) during maintenance work.

FIG. (5): a variant of a conveyor.

FIG. (6): a retention device for a roller.

FIG. (7): a variant of a retention device for a roller.

DESCRIPTION OF THE PREFERRED EMBODIMENT(S)

Referring to the drawings, we see a conveyor of the belt or batten type. Conventionally, a conveyor (1) includes an endless transporting surface (3) moving on a guidance surface (4) formed with a curved profile, and supported on a chassis (2). Mounted above the endless belt or surface (3) is a cover (5), so as to constitute a closed volume (6).

The edges of the transporting endless surface (3) have to be raised in order to form a gully designed to contain the bulk material deposited upon this conveyor. Known tensioners and drive resources provide for movement of the endless belt. The transported material moves in a tunnel which is open at both ends. The curvature of the belt, viewed on the axis transversal to the movement of the belt, or indeed the profile of the gully, is determined by a horizontal roller (7) and two lateral surfaces (8), possibly curved, located on either side of the aforementioned roller.

Each lateral surface extends beyond the shape former. It is not a mobile roller but rather a bearing surface that is fixed in relation to the movement of the belt.

Each lateral surface (8) is extended laterally beyond the surface on which the endless belt is resting. There is no break between its inner edge and its outer edge. Each of these forms an angle with the horizontal.

At least locally, at least one of the lateral surfaces (8) is fixed to the chassis by rapid attachment devices (9) so as to constitute a sort of access door, rapidly providing an opening into the enclosed volume.

By means of rapid attachment devices is meant, for example, a latch or a coarse-pitch screw, as opposed to a series of bolts necessitating a long time to undo, even as long as 10 minutes.

The lateral surface (8) therefore has the function of guiding the endless belt and an additional function as an access door. Throughout the length of the journey, the lateral surface formed by the lateral wall is continuous. Thus, with the cover (5) and the endless belt, the structure constitutes a closed tube.

The conveyor does have an opening at the base however. This opening is located at the position of the horizontal rollers placed all along the trajectory. Thus, if material penetrates into the space located between the lateral surface and the lower face of the belt, it is able to exit via this opening, with no risk of accumulation. The removable lateral surface (8) is preferably supported by guidance elements (10), employed to move it between two positions which have been determined beforehand, namely an active position and a so-called servicing position in which the lateral surface is moved away from the belt to allow visual access to the belt.

Locking will be achieved by means of a simple latch, to be operated or released.

The wall presenting the guidance surface is supported by a bracket for example.

In a first method of implementation, these guidance elements (10) are capable of constituting a sideways guidance system, by means of at least one slide (10A) and its runner (10B), for example.

According to another method, each element (8) of the lateral wall is secured by at least one hinge (10C) so as to achieve a tilting or rotation action about an axis determined during assembly. We have represented the shape as an axial articulation parallel to the movement axis of the endless belt. The hinge is placed at the base of the lateral wall which is held by a support element. This hinge can be on a vertical axis, with each the lateral wall then behaving as a single-leaf door. One then only has to tilt the support carrying the curved lateral surface in order to open access to the belt.

This aspect allows very easy displacement of a part of the lateral wall of the conveyor in order to gain access to the interior of the material containment tube. Moreover, if material is introduced into the space located between the lower face of the belt and the upper face of the curved lateral surface, it exits via the interstice that exists between the roller and the curved lateral surface.

It is preferable that the lateral surfaces (8) should be rapidly mobile at all points. As can be seen on the drawing, the active face of the lateral surface (8) is composed of at least two planes or two curves forming between them a break (12) which is employed to stop the belt in its lateral movement. This break is located in a zone of the bearing surface which, theoretically, is not in contact with the belt when the latter is centred on its movement axis. In fact, during its movement, the belt is not held rigorously on the movement axis but also moves laterally. Thus, when the edge of the belt encounters the break, the force required to go beyond this break has to increase, and the belt starts back in the other direction due to the reaction phenomenon. The lateral walls can be of steel, for example.

At least the active surface of the lateral surface is slightly rough. A layer of a material that facilitates the sliding action can cover the lateral wall presenting the said lateral surface.

As can be seen, the cover is raised in order to increase the volume of the tube and to limit excess pressures.

The free edge (8A) of the lateral wall presenting the lateral surface is solidly attached to the cover by a removable securing device such as a latch. The cover could be mounted on a hinge. In order to facilitate maintenance, it has been arranged that the horizontal roller (7) should be mounted on a tilting support (13) that allows it to be released rapidly in order to change it. As an example, this support includes two cheek-plates (13A), each with a slot (14) allowing the rotation axle of the horizontal roller to slip into it. The slots (14) are designed to engage the axle of the roller from the top. Thus, when the support is raised, the roller is applied beneath the belt. The roller (7) cannot therefore exit from these slots.

The slots (14) could open out to the front or to the bottom but that would require the provision of a locking device at the entrance to the slots.

The chassis or the cross member carrying the lateral surfaces and the roller also has a protective entry-prevention arrangement.

It is preferable that the support should have this protective entry-prevention device (15) in order to limit the risk that an item of clothing might be trapped by the roller and the belt. This is a plate (15) which is positioned upstream of the roller. These arrangements greatly facilitate technical servicing.

The roller and the lateral surfaces with their rapid fixing devices are mounted on a cross member forming an assembly that is easy to fix onto an existing chassis. The cover can be raised in its vertical part.

What is claimed is:

1. A guidance surface designed to carry a transporting endless belt, this guidance surface being characterized in that the curvature of the guidance surface is determined by:
   a horizontal roller; and
   two lateral surfaces fixed in relation to movement of the endless belt and located on either side of the aforementioned roller,
   where each lateral surface is curved, forms a continuous wall surface along a longitudinal axis of the endless belt throughout the entire length of the belt, and, along with the roller, forms a portion of a bearing surface adapted to support and extend beyond the belt and, at least locally, at least one of the lateral surfaces is fixed to a chassis by rapid securing devices so as to provide an access door to the belt, and
   where at least one of the lateral surfaces is rotatably or slidably supported by guidance devices adapted to constrain movement of the lateral surface between two positions, which have been determined beforehand, to provide the access door.

2. A guidance surface in accordance with claim 1, wherein the guidance devices are guidance resources in translation.

3. A guidance surface in accordance with claim 1, wherein the guidance devices are guidance resources in rotation.

4. A guidance surface in accordance with claim 1, wherein the guidance surface includes a break.

5. A guidance surface in accordance with claim 1, wherein the lateral surface carries a layer of material that facilitates sliding action.

6. A guidance surface in accordance with claim 1, wherein the horizontal roller is mounted on a tilting support.

7. A guidance surface in accordance with claim 6, wherein the support includes two cheek-plates.

8. A guidance surface in accordance with claim 7, wherein the support includes two slots to accommodate an axle of the roller.

9. A conveyor comprising:

a guiding surface;

an endless belt carried by the guiding surface, the guiding surface having a curvature defined by a horizontal roller; and two lateral surfaces fixed in relation to movement of the endless belt, said lateral surfaces being located on diametrically opposite sides of the roller, each lateral surface being curved, forming a continuous wall surface along a longitudinal axis of the endless belt throughout the entire length of the belt, and, along with the roller, forming a portion of a bearing surface for supporting and extending beyond the belt, at least one of the lateral surfaces being fixed to a chassis by rapid securing devices so as to provide an access door to the belt, and at least one of the lateral surfaces being rotatably or slidably supported by guidance devices adapted to constrain movement of the lateral surface between two predetermined positions to provide the access door.

10. A conveyor in accordance with claim 9, wherein the guidance devices are guidance resources in translation.

11. A conveyor in accordance with claim 9, wherein the guiding devices are guidance resources in rotation.

12. A conveyor in accordance with claim 9, wherein the guidance surface includes a break.

13. A conveyor in accordance with claim 9, wherein the lateral surfaces have a layer of material that facilitates a sliding action.

14. A conveyor in accordance with claim 9, wherein the horizontal roller is mounted on a tilting support.

15. A conveyor in accordance with claim 14, wherein the support includes two cheek-plates.

16. A conveyor in accordance with claim 15, wherein the support includes two slots to accommodate an axle of the roller.

17. A conveyor in accordance with claim 16, wherein the lateral surfaces are coated with a low friction material that facilitates a sliding action.

18. A guidance surface for supporting a transporting endless belt, said guidance surface having a curvature defined by:

a horizontal roller mounted on a tilting support having two cheek-plates and slots to accommodate an axle; and two lateral surfaces fixed in relation to movement of the endless belt and located on either side of the horizontal roller and having a surface layer that facilitates a sliding action, each lateral surface being curved, forming a continuous wall surface along a longitudinal axis of the endless belt throughout the entire length of the belt, and, along with the roller, forming a portion of a bearing surface occupied by and extending beyond the belt and, at least locally, a rapid securing device for securing at least one of the lateral surfaces to a chassis to provide an access door to the belt, the lateral surface being rotatably or slidably supported by guidance devices for constraining movement of the lateral surface between two predetermined positions to provide the access door.

19. A guidance surface in accordance with claim 1, wherein at least one of the lateral surfaces is adapted to receive a cover.

20. A conveyor in accordance with claim 9, wherein at least one of the lateral surfaces is adapted to receive a cover.

* * * * *